Feb. 18, 1969   H. BODE ETAL   3,427,921
ROCKET LAUNCHING MOUNT
Filed June 27, 1966
Sheet 1 of 2
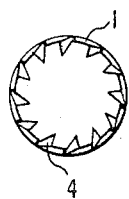
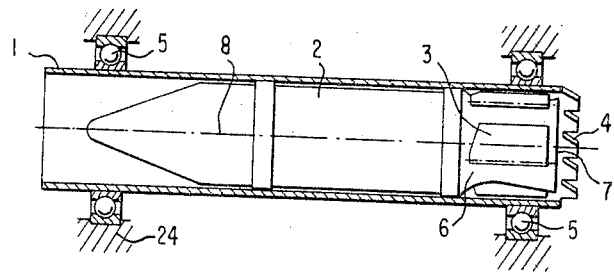
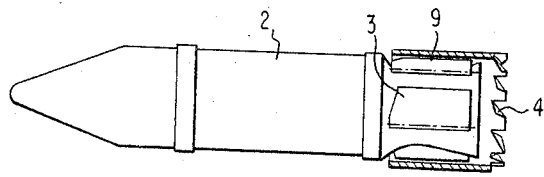
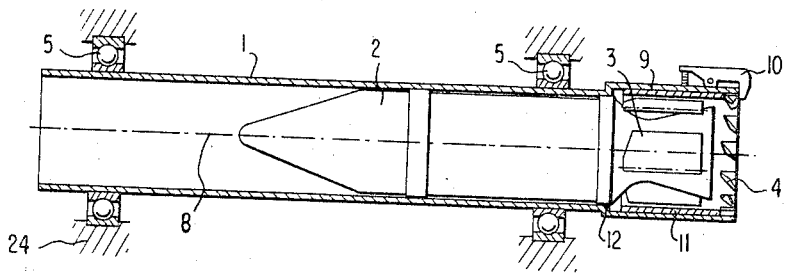
INVENTORS
HELMUT BODE
JOACHIM NICODEMUS
BY
Dicke & Craig
ATTORNEYS

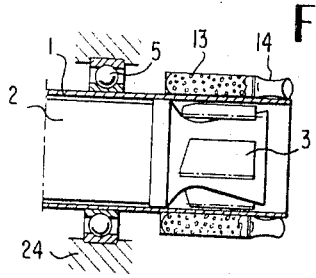
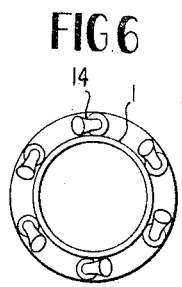
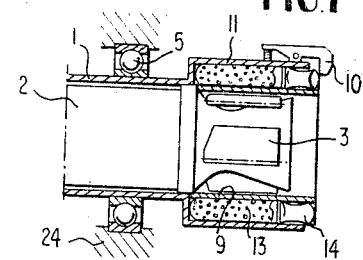
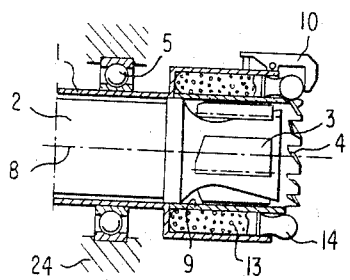
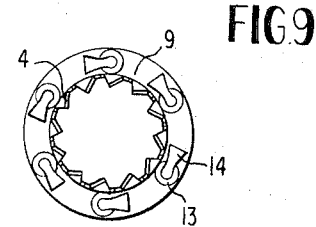
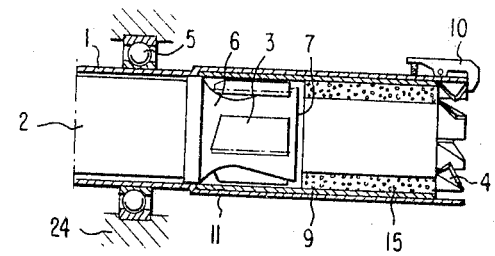
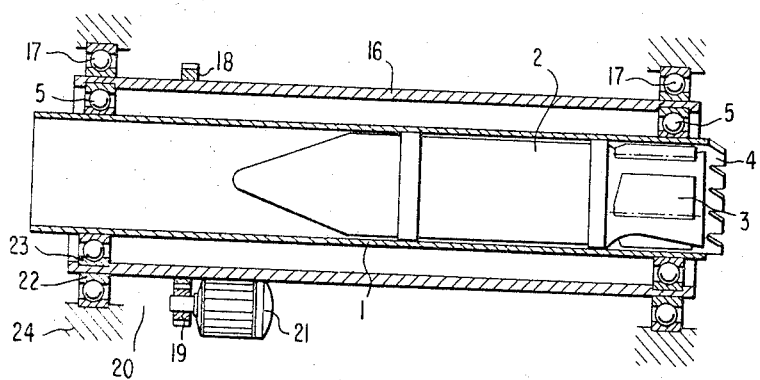

United States Patent Office 3,427,921
Patented Feb. 18, 1969

3,427,921
ROCKET LAUNCHING MOUNT
Helmut Bode, Westercelle, and Joachim Nicodemus, Nienberg, Germany, assignors to Dynamit Nobel Aktiengesellschaft, Troisdorf, Germany
Filed June 27, 1966, Ser. No. 560,455
Claims priority, application Germany, July 5, 1965, D 47,660
U.S. Cl. 89—1.808
Int. Cl. F41f 3/04
12 Claims

ABSTRACT OF THE DISCLOSURE

A tubular rocket launcher having guide vanes to produce rotational force from the exhaust of the rocket and auxiliary power units having rotation producing propellant charges. The guide vanes and charges are on a separate tube that contains the foldable rocket tail assembly, with the remainder of the rocket launcher being rotatably mounted with respect to a support.

Background of the invention

In the prior art, it is well known that projectiles will be stabilized by rotation about their longitudinal axes or stabilizing tail assemblies. It is also known to rotate surface stabilized rockets, for example, rockets having a stabilizing tail assembly, about their longitudinal axis to compensate for structural inaccuracies, or if necessary, for other influences that have an undesirable effect on the firing characteristics; this has been accomplished by guide tracks that are built into the launching mount or guide vanes installed in the rocket jet outlet. However, both of these latter methods do not satisfactorily cope with the problem of the so-called stalling effect, that is, the non-axial movement or falling off of the rocket upon leaving the launcher, of a rotating rocket fired from a stationary launcher. This particular disadvantage has been overcome by prior art devices that rotate the launcher by drive motor; however, this method requires a considerable expenditure for the driving motor, gear and transmission parts, for example. The cost and complexity is particularly high for large and heavy rockets, or multi-rocket launchers. Therefore, even this latter method does not satisfactorily solve the problem.

Summary of the invention

It is an object of the present invention to provide a rocket launching mount that will overcome the foregoing disadvantages and in an economical, simple, and advantageous manner.

More particularly, it is an object of the present invention to provide a rocket launching mount that will rotate a surface stabilized rocket to a desired predetermined specific speed by means that are simpler and involve less weight and special requirement than the prior art devices.

In accordance with the present invention, the above objects are obtained in a rocket launching mount for surface stabilized rockets, comprising at least one launcher, or the like, that is mounted for free rotation about its axis and secured against axial displacement, and means rigidly connected with the launcher for rotating the launcher during firing of the rocket.

A particularly advantageous embodiment of the present invention employs a launcher having a ring of turbine-like guide vanes symmetrically mounted at the rear end of the launcher and extending in a skewed manner with respect to the launcher axis into the cross-sectional area of the rocket nozzle jet stream; these vanes will cause the launcher to rotate about its axis when the rocket combustion gases emerge from the rocket nozzle and impinge upon the vanes during launching of the rocket.

Another advantageous embodiment of the present invention may be employed alone or in combination with the above-mentioned embodiment to provide rotation of the freely rotatable rocket launcher. This embodiment provides a plurality of auxiliary propulsion units, each having a propellant charge and nozzle, uniformly distributed over the circumference of the launcher. The propulsion jet of the auxiliary propulsion unit will have a component at right angles to the axis of the launcher; preferably, the propulsion jet of the auxiliary units will extend precisely tangentially to the circumference of the launcher, in a plane that is at right angles to the launcher axis, because this in the most efficient use of the auxiliary unit energy for the rotational drive of the launcher and it will prevent the auxiliary units from exerting an axial force, which would have to be absorbed by more massive or complex bearing structures. The rotational connection between the rocket and its launcher may be accomplished by friction and/or by stops, abutments, or the like.

It is contemplated that the guide vanes may be integrally attached to the launcher, particularly by providing a plurality of circumferentially spaced generally axially extending slots with bent portions therebetween in the rear end of a tubular launcher. It is also contemplated that the guide vane may be replaceably mounted on the launcher, because it has been found that the guide vanes are subjected to a considerable amount of mechanical stress and erosion from the rocket combustion gases, which tend to destroy the guide vanes in a relatively short period of time. With this removable arrangement, a new set of vanes may be used for each firing of a rocket. It is particularly advantageous to provide the guide vanes as an integral part of a tubular element used to constrain the foldable tail assembly of a rocket until the rocket leaves the launcher; such a tubular element would be a part of the rocket before firing and would be disposed of after firing of the rocket. With the above replaceable arrangements, the guide vanes may be removed after each firing and new guide vanes may be installed. When the guide vanes are an integral part of a replaceable tubular element, the tubular element may be constrcted to protect the portions of the launcher that would be subjected to abnormal wear and tear. In considering the broader aspects of the present invention, it is apparent that many other methods may be used for the construction of the guide vanes, for example, the guide vanes may be cast with the tubular element or formed by a mill, or other metal working machine. Also, it is contemplated that the guide vanes may be made individually and individually mounted or attached to the launcher, tubular element, or the like by bolting, riveting, or welding, or the like.

Another advantageous embodiment of the present invention employs an additional propellant charge between the rocket nozzle and the guide vanes, which will cause the launcher to rotate either before or during the ignition of the rocket so that the energy of the rocket propellant will not be needed to rotate the launcher and thus lost for producing forward thrust of the rocket. This additional propellant charge may be quite small, because it is only needed for a relatively short period of time. If the additional propellant charge is employed in combination with guide vanes and auxiliary propulsion units it would suffice to construct the auxiliary units so that they are only sufficient to overcome the stationary inertia friction of the launcher, because the main rotation of the launcher would be accomplished by the reaction on the guide vanes produced by the combustion gases of the additional propellant charge. Also, it is contemplated that the additional propellant charge may be used for accelerating the rocket during the start of the firing; therefore, it would be constructed correspondingly larger.

Brief description of the drawing

Further objects, features, and advantages of the present invention will appear from the following description, of the accompanying drawing, in which:

FIGURE 1 is an axial cross-sectional view of the rocket launching mount of the present invention showing a rotatably mounted launcher having guide vanes and containing a rocket having a foldable tail assembly;

FIGURE 2 is a rear view of the guide vane ring of the launcher according to FIGURE 1;

FIGURE 3 is an illustration of a rocket having a foldable tail assembly constrained by an integral supporting tube having guide vanes, according to another embodiment of the present invention;

FIGURE 4 is an axial cross-sectional view of a rocket launching mount containing the rocket shown in FIGURE 3;

FIGURE 5 is an axial cross-sectional view of the rear end of another embodiment of the rocket launching mount according to the present invention, which has auxiliary propulsion units mounted on the launcher, which contains a rocket having a foldable tail assembly;

FIGURE 6 is a rear end view of the launcher according to FIGURE 5;

FIGURE 7 is a partial axial cross-sectional view showing a modification of the rocket launching mount according to FIGURE 5, with the auxiliary propulsion units mounted on a replaceable integral supporting tube;

FIGURE 8 is a partial axial cross-sectional view of modification of FIGURE 7's rocket launching mount and has a plurality of guide vanes on the rear of the supporting tube;

FIGURE 9 is a rear end view of the launcher and supporting tube of FIGURE 8;

FIGURE 10 is a partial axial cross-sectional view illustrating another embodiment of the present invention similar to that of FIGURE 8 and employing an additional propellant charge within the supporting tube, and FIGURE 11 is an axial cross-sectional view similar to FIGURE 1 showing another embodiment of the present invention.

Detailed description of the drawing

In the embodiment according to FIGURE 1, the launcher 1 contains a rocket 2 having a foldable tail assembly 3. The launcher 1 is provided with a ring of symmetrically arranged turbine-like guide vanes at the rear end. The launcher 1 is freely rotatably mounted on the support 24, schematically shown, against axial displacement by means of the bearing 5 arranged at the front and rear ends; it is contemplated that other types of bearings and bearing arrangements may be employed. With reference to FIGURES 1 and 2, it is seen that the guide vanes are uniformly constructed by axially slotting the rear end of the tubular launcher 1 and bending the intermediate portions of the launcher toward the interior of the launcher so that the vanes are skewed with respect to the launcher axis 8. The guide vanes may be plane, curved, or arched.

During firing of the rocket, the combustion gases produced by the ignition of the rocket propellant charge emerge at the rear end 7 of the rocket nozzle 6 and act upon the guide vane 4 to cause the launcher 1 to rotate about its axis 8 within the bearing 5. The rocket 2 rotates with the launcher 1, because of the friction between the rocket 2 and the launcher 1 and/or approximately constructed stops, abutments, or the like (not shown). The rocket launching mounts may be constructed and proportioned so that the rocket 2 will rotate at the desired predetermined speed about its axis after leaving the launcher 1.

In the embodiment according to FIGURES 3 and 4, the rocket 2, which is identical to the rocket 2 of FIGURE 1, has its foldable tail assembly 3 constrained by a supporting tube 9 having integral guide vanes 4. In this embodiment and the other embodiments of the present invention, the same numerals refer to corresponding elements. The rocket 2 and supporting tube 9 are prevented from falling out of the rear of the launcher 1 by latch means 10, or the like. The rear end of the launcher 1 has a portion of increased diameter 11 connected with the forward portion of the launcher 1 by a shoulder portion 12. The portion 11 snugly carries the supporting tube 9, which is rotationally connected with the launcher 1 by stops, or the like (not shown) so that the launcher 1 will rotate when the rocket combustion gases strike the guide vanes 4 on the supporting tube 9.

The operation of the rocket launching mount according to FIG. 4 is similar to the previously described operation of the rocket launching mount according to FIGURE 1, with the launcher 1 and rocket 2 rotating within the bearings 5 relative to the support 24. As the rocket 2 moves out of the launcher 1 during firing, the supporting tube 9 is retained within the launcher 1 by the shoulder portion 12, so that the guide vanes 4 will be effective to produce rotation of the rocket 2 as long as the rocket 2 is within the launcher 1 during firing.

In the embodiment of the present invention according to FIGURE 5 the rotation of the launcher 1 in the bearings 5 relative to the support 24 is obtained by means of auxiliary propulsion unit 13, which are distributed uniformly over the circumference of the launcher 1 with their nozzles 14 directed obliquely rearwardly, or preferably tangentially to the launcher 1. The ignition of the auxiliary propulsion units 13 may be either prior to the ignition of the rocket propellant charge or substantially simultaneously therewith. In the previously described embodiments of FIGURES 1 to 4, the energy of the rocket propellant charge is used to produce the rotation of the launcher 1; in contrast to this, the embodiment of FIGURES 5 and 6 employ the auxiliary propulsion units 13 to produce the rotation of the launcher 1.

The embodiment according to FIGURE 7 is quite similar to the embodiment according to FIGURE 5. In FIGURE 7, the auxiliary propulsion units 13 are carried on a supporting ring 9, which constrains the foldable tail assembly 3 of the rocket 2. The auxiliary propulsion units 13 and the supporting tube 9 are held within the portion of increased diameter 11 of the launcher 1 by means of latches 10. After the rocket 2 has been fired, the rear end of the latch 10 is pivoted upwardly and the burnt out auxiliary propulsion units 13 together with their supporting tube 9 are removed from the launcher 1 and replaced by a corresponding new assembly for subsequent firing. The nozzles 14 of the auxiliary propulsion units 13 are directed generally tangentially to rotate the launcher 1 within the bearing 5 relative to the support 24, when the auxiliary propulsion units 13 are fired.

The embodiment according to FIGURES 8 and 9 is identical to the embodiment of FIGURE 7, except that guide vanes 4 are provided on the rear end of the supporting tube 9. It is contemplated that the guide vanes 4 could be provided on the rear end of the launcher 1, if the auxiliary propulsion units 13 were mounted on the outside of the launcher 1, as shown in FIG. 5. In FIGURES 8 and 9, the nozzles 14, of the auxiliary propulsion units, extend tangentially to the launcher 1 in a plane at right angles to the axis 8 of the launcher 1 to rotate the launcher 1 within the bearings 5 relative to the support 24. The auxiliary propulsion units 13 may be relatively small to only start the rotation of the launcher 1 and rocket 2, and upon the subsequent ignition of the rocket propellant charge, the guide vanes 4 will be acted upon by the rocket propellant charge combustion gases to produce the desired departure rotational velocity of the rocket 2. The auxiliary propulsion units 13 and supporting tube 9 will remain in the launcher after firing of the rocket 2 and may be replaced, during reloading, by new units.

The embodiment according to FIGURE 10 is identical to the embodiment according to FIGURE 8, except that the portion of increased diameter 11 and the supporting-tube 9 have been extended in the axial rearward direction to provide room for an additional propellant charge 15 which is secured to the supporting tube 9. The additional propellant charge 15 is disposed between the rear end 7 of the nozzle 6 and the guide vanes 4. This additional propellant charge is ignited simultaneously with the rocket propellant charge and produces rotation of the launcher 1 together with the rocket 2 through the action of the combustion gases on the guide vanes 4; also, the velocity of departure of the rocket 2 will be increased by the additional propellant charge 15. In addition, it is contemplated that auxiliary propulsion units for producing an initial rotation could be used in combination with the embodiment of FIGURE 10.

The embodiment according to FIGURE 11, is identical to the embodiment according to FIGURE 1, except for the construction of the support 24, which carries the launcher 1 by means of the bearings 5. In all of the previously described embodiments, the launcher 1 has been directly connected to a stationary support 24 by means of bearings 5. In contrast to this, in the embodiment of FIGURE 11, the launcher 1 is mounted by means of the bearings 5 for relative free rotation with respect to an intermediate support member 16. The intermediate support member 16 is rotatably mounted by bearings 17 on a stationary support member, which is schematically shown. A ring gear 18 is rigidly attached to the intermediate support member 16 for driving engagement with the gear 19 rotatably carried by the shaft 20 of the driving motor 21, which is rigidly attached to the stationary support member (not shown).

In the embodiment according to FIGURE 11, the motor 21 causes the intermediate support member 16 to rotate along with the rigidly attached bearing braces 22 and 23 of the bearings 17 and 5 respectively. Therefore, the rest inertia and friction of the bearings 5, 17, and the intermediate support member 16 will not have to be overcome during firing of the propellant charge, so that the desired rotational speed of the rocket 2 will be reached more easily and more rapidly than in the embodiment according to FIGURE 1. The driving motor 21 may be relatively small, because it is only needed to produce a force sufficient to rotate the intermediate support member 16 and not necessarily overcome the inertia of the launcher 1 and rocket 2, which is overcome by the action of the rocket propellant charge combustion gases on the guide vanes 4. It is contemplated that the output of the driving motor 21 may be adjustable to produce different desired results. Also, it is contemplated that separate drives may be provided for both the front and rear bearings.

It will be understood that the embodiments shown and described must be considered as examples; other modifications and embodiments will be apparent from the above teachings of the broader aspects of the invention. For example, the guide vanes could be constructed on a separate ring, which is mounted on the rear end of the launcher or the rear end of the supporting tube, respectively, so that the guide vanes could be replaced after each rocket is fired. Also, it is contemplated that the guide vanes 4 may be of a different size and shape than that illustrated. Thus, the present invention is not limited to the details shown and described herein, but is susceptible of numerous changes and modifications within the spirit and scope of the invention as defined by the following claims.

We claim:

1. A launching mount, having front and rear ends, for rockets with a radially foldable tail assembly, nozzle and propellant charge, comprising: a support; at least one launcher mounted on said support for free relative rotation about its axis and secured against axial displacement relative to said support; said launching including means rotating said launcher relative to said support during firing of the rocket; said rotating means including a ring of turbine-blade like guide vanes at the rear end of said launcher and symmetrically arranged in a skewed manner with respect to the axis of said launcher; said launcher comprising at least two readily separable portions, one of which is rotatably secured to said support and the other of which is a supporting tube means for constraining the foldable tail assembly of the rocket and being integral with said guide vanes.

2. The launching mount according to claim 1, wherein said rotating means further includes a plurality of auxiliary propulsion units having a propellant charge and nozzle, said units being uniformly mounted about the circumference of said supporting tube means; and each of said units having a nozzle axis that extends generally normal to a plane passing through the axis of said launcher and the respective unit.

3. The launching mount according to claim 2, wherein said launcher is generally tubular and said guide vanes are formed on the rear end of said supporting tube means by generally axially extending slots and inwardly bent portions of the launcher intermediate the slots.

4. The launching mount according to claim 1, said rotating means further including an additional propellant charge means mounted rearwardly of the rocket nozzle for ignition with the rocket propellant charge.

5. The launching mount according to claim 1, said rotating means further including an additional propellant charge means disposed between the rocket nozzle and said guide vanes for ignition with the rocket propellant charge.

6. The launching mount according to claim 1, including an additional propellant charge means disposed between the rocket nozzle and said guide vanes for ignition with the rocket propellant charge; and said additional propellant charge means being integrally attached to said tube means.

7. The launching mount according to claim 1, wherein said launcher is generally tubular and said guide vanes are formed on the rear end of said supporting tube means by generally axially extending slots and inwardly bent portions of the launcher intermediate the slots.

8. The launching mount according to claim 7, wherein said one separate portion comprises a first forward tubular portion, a second rearward tubular portion of increased diameter and an intermediate shoulder portion connecting said first and second portions; said tube means being snugly received in said second tubular portion of said one separable portion for forward abutting engagement with said shoulder portion; latch means mounted on said launcher for retaining said supporting tube means against axial rearward movement; and said guide vanes being formed on the rear end of said supporting tube means by generally axially extending slots and bent portions of said supporting tube means between said slots.

9. The launching mount according to claim 8, said rotating means further including an additional propellant charge means mounted rearwardly of the rocket nozzle for ignition with the rocket propellant charge.

10. The launching mount according to claim 1, wherein said one separable portion comprises a first forward tubular portion, a second rearward tubular portion of increased diameter and an intermediate shoulder portion connecting said first and second portions; said tube means being snugly received in said second tubular portion of said one separable portion for forward abutting engagement with said shoulder portion; latch means mounted on said launcher for retaining said supporting tube means against axial rearward movement; and said guide vanes being formed on the rear end of said supporting tube means by generally axially extending slots and bent portions of said supporting tube means between said slots.

11. The device of claim 10, wherein said rotating means further includes a plurality of auxiliary propulsion units having a propellant charge and nozzle, said units being uniformly mounted about the circumference of said supporting tube means; and each of said units having a nozzle axis that extends generally normal to a plane passing through the axis of said launcher and the respective unit.

12. The launching mount according to claim 10, said rotating means further including an additional propellant charge means mounted rearwardly of the rocket nozzle for ignition with the rocket propellant charge.

References Cited

UNITED STATES PATENTS

| 2,701,984 | 2/1955 | Terce | 89—1.808 |
| 3,009,393 | 11/1961 | Lynch | 89—1.808 |

FOREIGN PATENTS 25,005    12/1893    Great Britain.

BENJAMIN A. BORCHELT, *Primary Examiner.*